United States Patent
Naito et al.

(10) Patent No.: US 9,971,446 B2
(45) Date of Patent: May 15, 2018

(54) TOUCH PANEL WITH INJECTION MOLDED HOUSING

(71) Applicant: Futaba Corporation, Mobara-shi, Chiba (JP)

(72) Inventors: Yasuyuki Naito, Mobara (JP); Kiyoyuki Deguchi, Mobara (JP); Takashi Inoue, Mobara (JP); Tsubasa Mitsuhashi, Mobara (JP)

(73) Assignee: FUTABA CORPORATION, Mobara-Shi, Chiba (JP)

( * ) Notice: Subject to any disclaimer, the term of this patent is extended or adjusted under 35 U.S.C. 154(b) by 0 days. days.

(21) Appl. No.: 15/270,195

(22) Filed: Sep. 20, 2016

(65) Prior Publication Data
US 2017/0090656 A1    Mar. 30, 2017

(30) Foreign Application Priority Data

Sep. 28, 2015  (JP) ................. 2015-189969

(51) Int. Cl.
| G06F 3/045 | (2006.01) |
| G06F 3/041 | (2006.01) |
| G06F 3/044 | (2006.01) |
| G06F 3/047 | (2006.01) |

(52) U.S. Cl.
CPC ............ *G06F 3/0416* (2013.01); *G06F 3/044* (2013.01); *G06F 3/047* (2013.01); *G06F 3/0412* (2013.01); *G06F 2203/04103* (2013.01); *G06F 2203/04104* (2013.01)

(58) Field of Classification Search
CPC ...... G06F 3/0416; G06F 3/0412; G06F 3/044; G06F 3/047; G06F 2203/04103; G06F 2203/04104
See application file for complete search history.

(56) References Cited

U.S. PATENT DOCUMENTS

| 2010/0285260 A1* | 11/2010 | Bookbinder | B32B 3/02 428/45 |
| 2015/0301669 A1* | 10/2015 | Miyazaki | G06F 3/044 345/173 |
| 2017/0090657 A1* | 3/2017 | Naito | G06F 3/0416 |

FOREIGN PATENT DOCUMENTS

JP          2011090443         5/2011

\* cited by examiner

*Primary Examiner* — Peter D McLoone
(74) *Attorney, Agent, or Firm* — Quarles & Brady LLP

(57) ABSTRACT

Provided is a touch panel having superior impact resistance and good design on an operation face side without a decorative layer. The touch panel is manufactured by forming a cut out portion at an outer edge of a substrate on an operation face side of the substrate so as to cover a lead-out line wiring region of lead-out lines of first electrodes and second electrodes, and forming a housing portion by insert injection molding using resin material so as to sandwich the outer edge of the substrate from upper and lower sides with an operation region of a sensor unit being a front face side, and such that the cut out portion is covered and a front face of the housing portion is arranged flush with the operation face of the substrate.

2 Claims, 4 Drawing Sheets

TOUCH PANEL WITH INJECTION MOLDED HOUSING

CROSS REFERENCE TO RELATED APPLICATIONS

This application is based on and claims the benefit of priority of Japanese Patent Application No. 2015-189969, filed on Sep. 28, 2015. The contents of this application are incorporated herein by reference in their entirety.

TECHNICAL FIELD

The present invention relates to a projected capacitive touch panel capable of multipoint detection.

BACKGROUND ART

In recent years, an electronic device such as a mobile phone, a smart device (e.g., tablets, e-book reader, etc.) and an automotive navigation system is mounted with a display device with a touch panel function (i.e., a display device with touch panel, a touch panel device) having the advantage that it can provide intuitive operation and has superior durability, as one embodiment of interface.

A touch panel is a position input device which detects touch actions made by an indicator such as a finger and a stylus and identifies the coordinates of the touch position. The detection types are classified broadly into a resistive film type including an analog resistive film type and a matrix resistive film type, a capacitive type including a surface capacitive type and a projected capacitive type, an optical type including an infrared scan type and a retroreflective type, and an ultrasound waves type including a surface elastic waves type and a plate waves type. These various types have been put into practical use.

Meanwhile, in recent years, among the above-mentioned detection types, there is an increase in demand for especially a projected capacitive touch panel. The projected capacitive touch panel is configured such that, when a finger approaches, it detects changes in capacitance of electrodes near the finger as position coordinates on the touch panel, from two longitudinal and lateral rows of electrodes.

FIG. 4 is a partial cross-sectional view of one example of the projected capacitive touch panel mentioned above. A projected capacitive touch panel 51 shown in FIG. 4 has a basic structure that is manufactured by forming a sensor unit 54 and fitting the sensor unit 54 into an engagement recessed portion 55a of a housing portion 55 via an adhesive material 56 such as a double-sided adhesive tape. The sensor unit 54 includes one translucent substrate 52 and an electrode portion 53 provided on one face (i.e., a back face opposite to a front face corresponding to an operation face side) of the substrate 52. The electrode portion 53 is formed by laminating a plurality of rows of first electrodes (e.g., X electrodes) formed of transparent conductive films extending in a first direction (e.g., a lateral direction) and a plurality of rows of second electrodes (e.g., Y electrodes) formed of transparent conductive films extending in a second direction (e.g., a longitudinal direction) intersecting the first electrodes. The substrate 52 includes lead-out lines 57 which are lead out from the respective ends of the electrode portion (i.e., the first electrodes and the second electrodes) 53 and which are formed via a decorative layer 58. Furthermore, there is provided a protective layer 59 made of transparent insulating film and formed so as to entirely cover the electrode portion 53 and the lead-out lines 57 of the sensor unit 54. A display device 60 such as a liquid crystal display is adhesively fixed via an adhesive material 61 such as a transparent adhesive tape at a position opposed to the sensor unit 54 of the substrate 52. Such projected capacitive touch panel is disclosed in Patent Literature 1 mentioned below.

Patent Literature 1: Japanese Patent Application Publication No. 2011-90443

SUMMARY OF THE INVENTION

Problem to be Solved

In the touch panel disclosed in Patent Literature 1, the lead-out lines 57 of the electrode portion 53 provided on the back face of the substrate 52 are arranged at a region other than an operation region (i.e., at an outer periphery), and the decorative layer 58 is provided to hide the lead-out lines 57 so the lead-out lines 57 are not visible to a user from the operation face side of the touch panel.

In this case, it is necessary to match the color of the decorative layer 58 with the color of the housing portion 55 to avoid spoiling the design of the electronic device mounted with the touch panel; however, it is very difficult to match the colors of the components which are made of different materials. In addition, there is a problem of an increase in manufacturing cost due to an increase in man-hour of the touch panel to provide the decorative layer 58.

Furthermore, the touch panel disclosed in Patent Literature 1 has a problem that, since the sensor unit 54 is fitted into the housing portion 55 and adhesively fixed via the adhesive material 61, the sensor unit 54 may possibly be separated from the housing portion when the touch panel is subjected to strong impact such as dropping.

Furthermore, since the electrode portion (i.e., the first electrodes and the second electrodes) 53 of the sensor unit 54 of the touch panel 51 is connected to a control IC (not shown) via the lead-out lines 57 extending from the ends of the electrode portion 53, corrosion of the lead-out lines 57 is likely to occur when they are exposed to outside air, possibly causing breaking of lines. Thus, to take measures against such problem, conventionally the protective layer 59 made of transparent insulating film is formed so as to cover the entire lead-out lines 57.

However, the performance evaluation test, under the condition of high temperature and high humidity (for example, 85 degrees C., 85%), carried on the touch panel 51 with the protective layer 59 made of the transparent insulating film have shown that, depending on the specifications of the protective layer, as time passes the moisture from outside passes through the protective layer 59 having the moisture permeability and reaches to the lead-out lines 57, causing the corrosion of the lead-out lines 57. Thus, for the constitution in which the lead-out lines 57 is simply covered by the protective layer 59, there is a need for further improvement in the corrosion resistance of the lead-out lines 57.

In view of the above-mentioned problems, an object of the present invention is to provide a touch panel which has superior impact resistance and which does not require a decorative layer but still has a good design when seen from operation face side.

How to Solve a Problem

To achieve the above-mentioned object, a first embodiment of the present invention provides a projected capacitive touch panel including, a sensor unit having first electrodes and second electrodes intersecting with each other, each of the first electrodes and the second electrodes being constituted of a plurality of rows of electrodes, the first electrodes and the second electrodes being formed on a back face of a substrate having translucency such that an intersecting portion of the first electrode and the second electrode is insulated, and a housing portion formed by insert injection molding so as to sandwich the sensor unit, wherein a cut out portion is formed on a front face side of the substrate so as to cover a wiring region of lead-out lines of the sensor unit provided on a back face side of the substrate, and wherein the housing portion is formed by insert injection molding using resin material, so as to sandwich an outer edge of the substrate from upper and lower sides while covering the cut out portion, and such that a front face of the housing portion is arranged flush with a front face of the substrate.

A second embodiment of the present invention provides the touch panel according to the first embodiment, in which the housing portion is molded so as to cover at least front faces of the lead-out lines.

Advantageous Effects of the Invention

According to the first embodiment of the invention, it is possible to mask the lead-out lines without providing the decorative layer for masking the lead-out lines to make them not visible from outside, resulting in reduction in the manufacturing cost. Also, since the housing portion is formed by insert injection molding with respect to the substrate, the substrate can be prevented from being detached from the housing portion due to the strong impact such as dropping, thereby providing the touch panel with high reliability.

According to the second embodiment of the invention, by forming the housing portion using insert injection molding so as to cover at least the region of the lead-out lines of the respective electrodes, the lead-out lines are entirely covered by the resin. Thus, the moisture is less likely to enter from outside, and the sufficient effect can be exerted against corrosion of the lead-out lines.

DESCRIPTION OF EXEMPLARY EMBODIMENTS

In the following, an embodiment of the present invention is explained in detail with reference to the attached drawings. It is to be understood that the present invention is not limited to this embodiment, and other embodiments, examples and operation practices that are conceivable to a person skilled in the art based on this embodiment are all included within the scope of the present invention.

In the following descriptions referring to the attached respective drawings, the terms such as upper, lower, right and left used to indicate direction or position correspond to upper, lower, right and left when a user sees the respective drawings as shown.

A touch panel 1 according to this embodiment is a projected capacitive touch panel which is capable of multi-point detection of a finger and which detects changes in capacitance of electrodes near the finger as position coordinates on the touch panel 1 from two kinds of rows, i.e., longitudinal and lateral rows, of the electrodes.

In the following, the constitution of the touch panel 1 according to the present invention is explained with reference to FIGS. 1 to 3. Although the touch panel 1 of this embodiment is shown to have a rectangular shape in a planar view, its shape is not limited to this and may be other shapes such as square shape, circular, oval and polygonal shape.

Figure 1A:
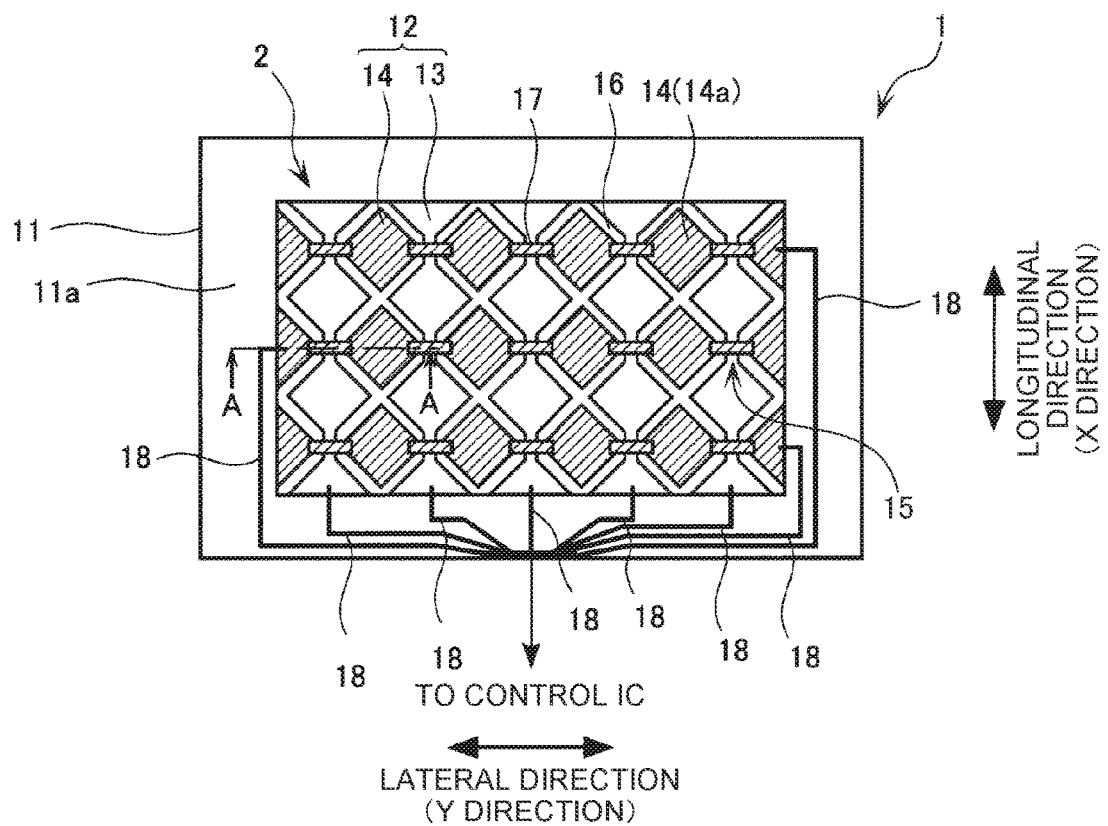
FIG. 1A is a plan view of a sensor unit of a touch panel according to the present invention seen from a back face side.

As shown in FIG. 1A, the touch panel 1 of this embodiment includes a sensor unit 2 provided with an electrode portion 12 constituted of first electrodes 13 and second electrodes 14 formed on a back face (i.e., a face located opposite to a front face corresponding to an operation face) of a translucent substrate 11, and a housing portion 3 formed by insert injection molding so as to sandwich the sensor unit 2 from upper and lower sides (i.e., from the front and back sides of the substrate 11).

Figure 1B:
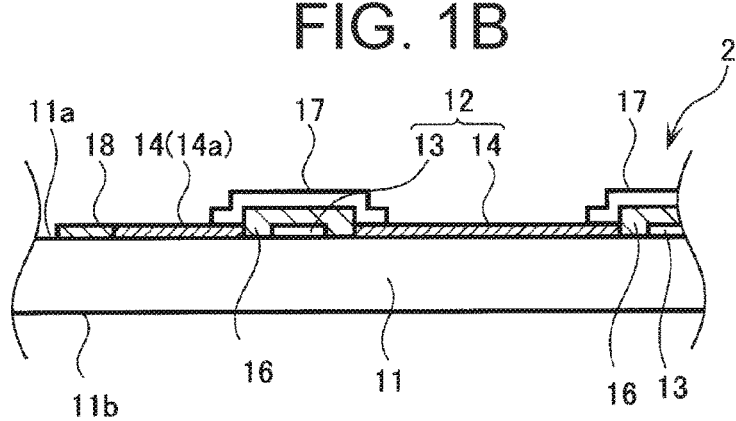
FIG. 1B is an enlarged cross-sectional view taken along a line A-A in FIG. 1A.

As shown in FIG. 1B, the sensor unit 2 has a rectangular plate-like substrate 11 as a base portion. The substrate 11 is formed of a translucent insulating material and is of a glass type or a film type. As the substrate 11 of a glass type, alkali-free glass, soda-lime glass, alumino-silicate glass and such are used. As the substrate 11 of a film type, a film made of resin such as polyethylene terephthalate (PET) is used.

The first electrodes 13 and the second electrodes 14 constituting the electrode portion 12 are formed on the back face (i.e., the face located opposite to the face to be operated by a finger, hereinafter called "operation opposing face") 11a of the substrate 11. The first electrodes 13 are formed by patterning a resist to a transparent conductive film such as ITO (Indium Tin Oxide) via photolithography and such and then applying etching. By doing so, the first electrodes 13 are formed as an array electrode in which a plurality of electrodes are aligned in a longitudinal direction (X direction) shown in FIG. 1A, for example.

Similar to the first electrodes 13, the second electrodes 14 are also formed by patterning a resist to the transparent conductive film such as ITO (Indium Tin Oxide) via photolithography and such and then applying etching. By doing so, the second electrodes 14 are formed as an array electrode in which a plurality of electrodes are aligned in a lateral direction (Y direction) shown in FIG. 1A, for example.

Next, the method of formation of the electrode portion 12 is explained. Firstly, on the operation opposing face 11a of the substrate 11, the plurality of first electrodes 13 extending in the longitudinal direction (X direction) in FIG. 1A and a plurality of electrode films 14a arranged in a separated condition in the lateral direction (Y direction) in FIG. 1A, are formed. Then, an insulating layer 16 is formed on the first electrode 13 at an intersecting portion 15 of the first electrode 13 and the second electrode 14. The insulating layer 16 provides electrical insulation between the first electrode 13 and the second electrode 14 and is formed of an insulating material such as acrylic resin. Then, as shown in FIG. 1B, the plurality of electrode films 14a are connected by a bridge line (jumper line) 17 in the lateral direction (Y direction) in FIG. 1A so as to cross over the first electrode 13, thereby forming the second electrode 14. In this regard, the bridge lines 17, which connect the electrode films 14a, 14a constituting the second electrode 14, are wired so as to pass over the insulating layers 16. In this embodiment, an inner rectangular portion shown in FIG. 2A, in which the electrode portion 12 is formed by the first electrodes 13 and the second electrodes 14, is referred to as an operation region E1 of the sensor unit 2.

In the method of formation of the electrode portion 12 described above, although the bridge lines 17 are used in the second electrodes 14, the constitution of the first electrodes 13 and the second electrodes 14 may be reversed, that is, the bridge lines 17 may be used in the first electrodes 13. In addition, the insulating layer 16 may be formed on the entire surface of one of the electrodes (i.e., the first electrodes 13 or the second electrodes 14), and the other of the electrodes (i.e., the second electrodes 14 or the first electrodes 13) may be formed on this insulating layer 16, as long as the intersecting portion 15 of the first electrode 13 and the second electrode 14 is insulated.

For the first electrodes 13 and the second electrodes 14 formed on the substrate 11 using the method of formation described above, respective ends thereof are lead out to an end of the substrate 11 by lead-out lines 18 and are connected by wiring to a control IC (control circuit) not shown, as shown in FIG. 1A.

Figure 2A:
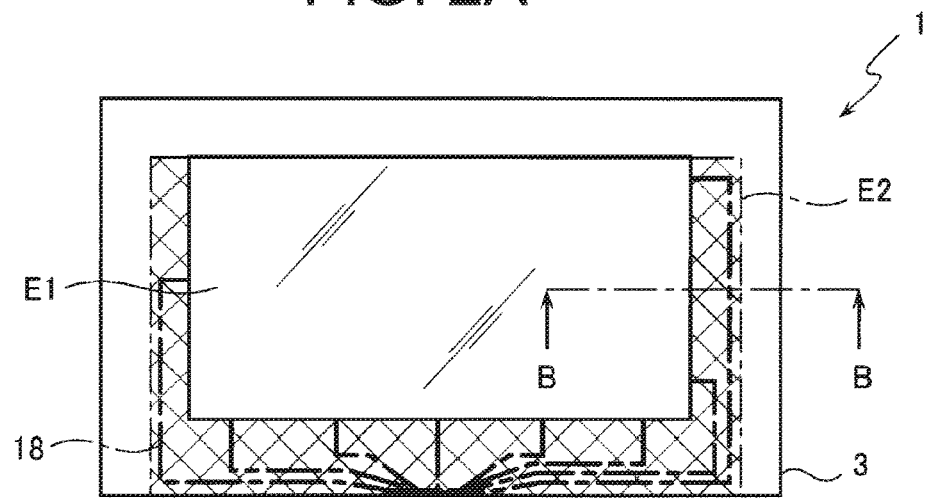
FIG. 2A is a planar view of one example of the touch panel according to the present invention.

Referring to FIG. 2A, the lead-out lines 18 are lines which are lead out from the respective ends of the first electrodes 13 and the second electrodes 14 in a lead-out line wiring region E2 (shown in FIG. 2A as a shaded region) which is a U-like shaped portion located outside of the operation region E1. The lead-out lines 18 are formed by forming a metallic film such as MAM (i.e., Mo/Al/Mo) and APC (i.e., Ag/Pd/Cu) by sputtering and forming a predetermined pattern to end of the substrate 11 by etching.

In a manner described above, in order to maintain the accuracy as a position sensor, the sensor unit 2 includes the first electrodes 13 and the second electrodes 14 constituted of linear electrodes are arranged on the substrate 11 in a XY matrix fashion in an electrically insulated condition. Thus, it is possible to detect which electrode in the X direction and which electrode in the Y direction, not just an approximate position on the electrode, and calculate the position using an intersection point of the detected electrodes.

Furthermore, a cut out portion 11c is formed at an outer edge of the substrate 11 on the side of the front face of the substrate 11 (i.e., the operation face 11b side of the substrate 11), so as to cover the lead-out line wiring region E2 of the lead-out lines 18 lead out from the first electrodes 13 and the second electrodes 14 to the operation opposing face 11a of the substrate 11.

By forming the cut out portion 11c on the operation face 11b side of the substrate 11 under the condition described above, when the housing portion 3 is formed by insert injection molding, this cut out portion 11c is covered by the resin material. Thus, on the completion of the touch panel 1, the lead-out lines 18 are not visible from outside. As a result, there is no need to provide the decorative layer for masking the lead-out lines 18 as was the case in the conventional art, but still has the same effect as when the decorative layer is provided.

Figure 3A:
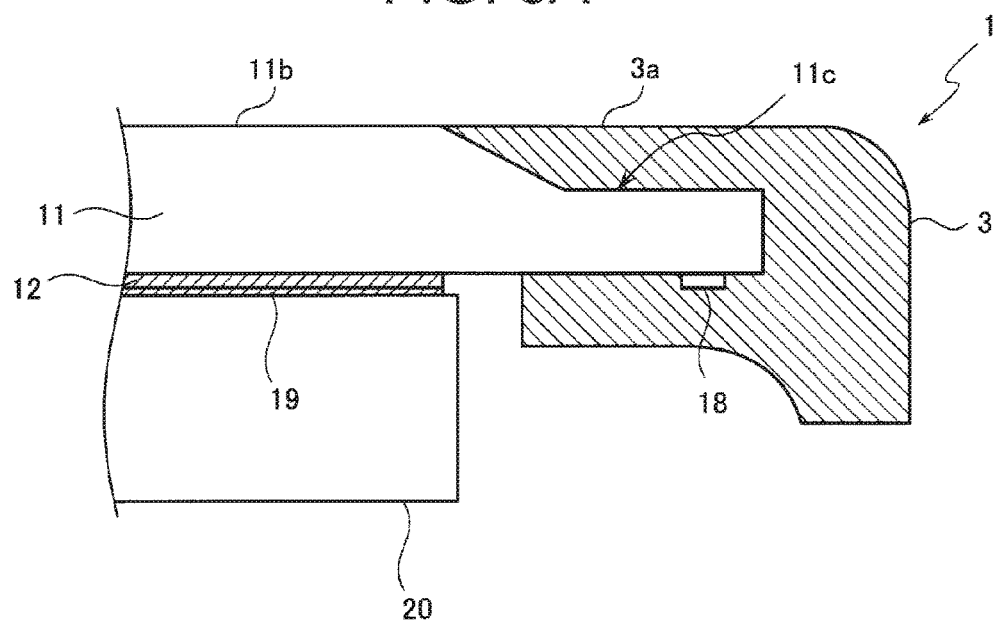
FIG. 3A shows an example of formation of a cut out portion formed on a substrate.
Figure 3B:
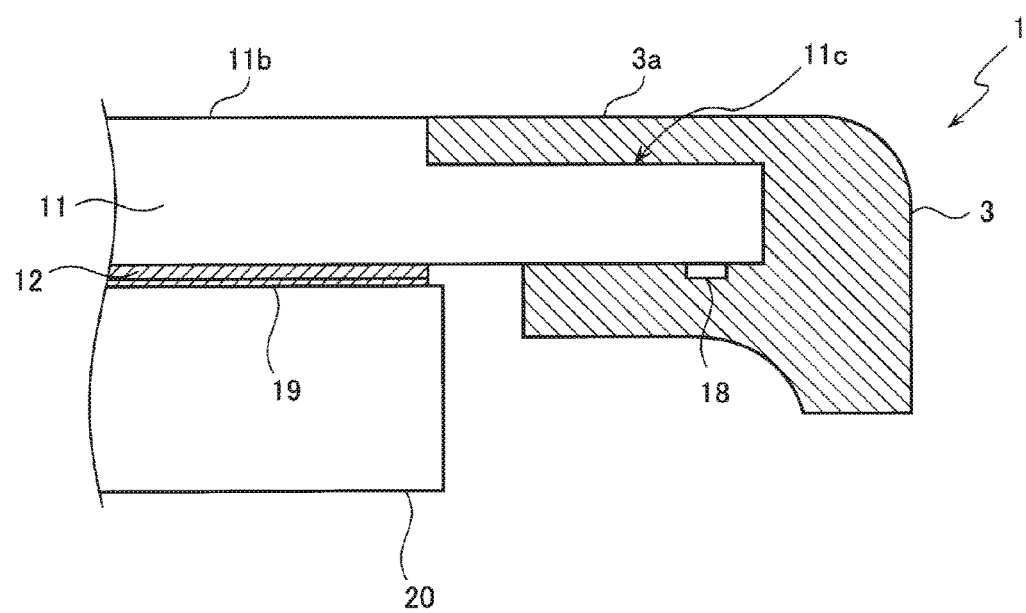
FIG. 3B shows another example of formation of the cut out portion formed on a substrate.
Figure 4:
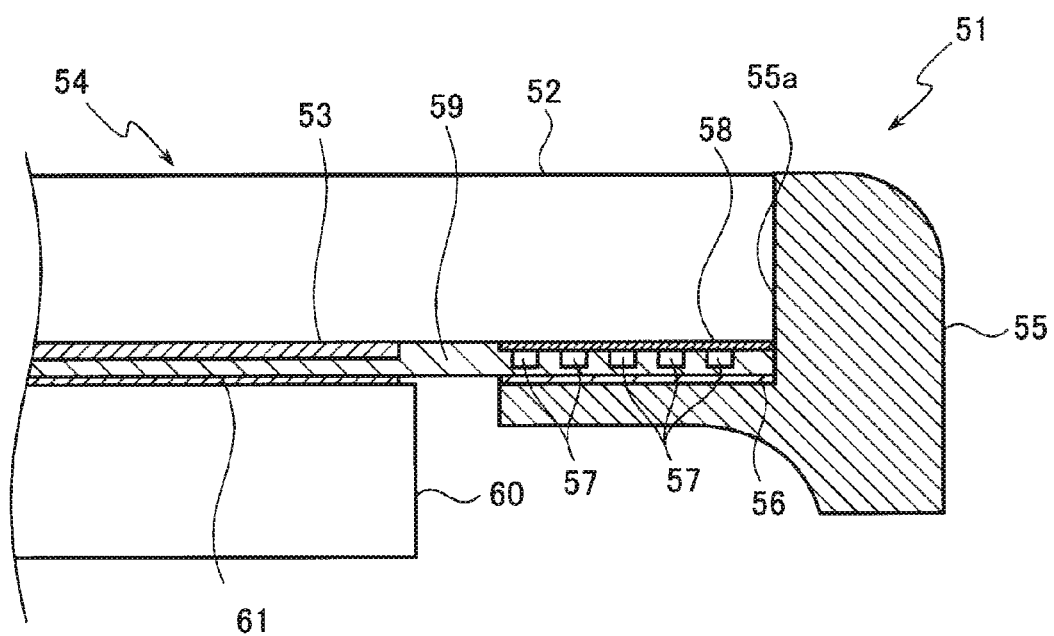
FIG. 4 is a partial enlarged cross-sectional view showing one example of an assembling structure of a convention touch panel.

In order to prevent the substrate 11 from being detached from the housing portion 3 after it is formed by insert injection molding as a result of expansion of the housing portion 3 due to the usage environment, it is preferable to cut the substrate 11 so as to form a different-leveled portion (e.g., a step portion) having a predetermined shape to the substrate 11 at a location outside the operation region E1, such that the contact area between the substrate 11 and the housing portion 3 is increased, as shown in FIGS. 3A, 3B.

In addition, in case of cutting the substrate 11 into the different-leveled shape as mentioned above, the shape of the different-leveled portion or the size of the step portion is not limited to those shown in FIGS. 3A and 3B, and may be designed in a suitable manner in accordance with the size of the touch panel 1 or the dimensions of the periphery of the housing portion 3.

The housing portion 3 is made of a thermoplastic synthetic resin such as commodity plastics and engineering plastics. The housing portion 3 is formed by insert injection molding using resin material, so that a front face thereof is arranged at a side of the operation face 11b corresponding to the operation region E1 (i.e., the region operated by a finger) of the sensor unit 2, that the housing portion 3 sandwiches the outer edge of the substrate 11 from the upper and lower sides (i.e., the front and back sides) so as to cover the cut out portion 11c formed on the side of the operation face 11b of the outer edge of the substrate 11, and that the front face 3a of the housing portion 3 is arranged flush with (i.e., on the same plane as) the operation face 11b of the substrate 11 in a seamless fashion.

Furthermore, the housing portion 3 is formed by insert injection molding so as to at least cover the lead-out line wiring region E2 of the lead-out lines 18 of the electrode portion 12 (i.e., the first electrodes 13, the second electrodes 14) formed on the operation opposing face 11a side of the substrate 11. By doing so, the lead-out lines 18 are directly covered by the housing portion 3, and thus the lead-out lines 18 can be prevented from corroding even under extreme condition such as a performance evaluation test, and the reliability of the product can be ensured.

Figure 2B:
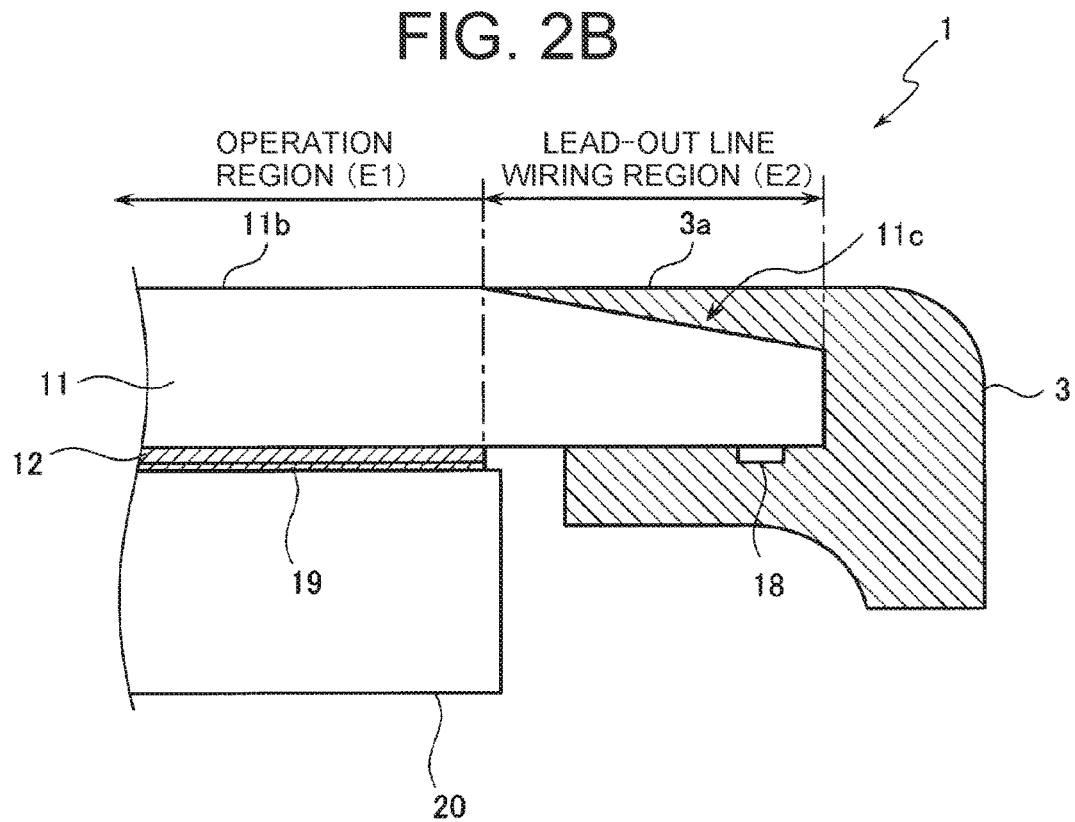
FIG. 2B is an enlarged cross-sectional view taken along a line B-B in FIG. 2A.

For the touch panel 1 configured as described above, the operation opposing face 11a (i.e., the face on which the sensor unit 2 is formed) of the substrate 11 is adhesively fixed to a display device (for example, various display devices such as a liquid crystal display and an EL display) 20 via an adhesive layer 19 such as a transparent adhesive tape, as shown in FIG. 2B.

By mounting the touch panel 1 on the display device 20 as one embodiment of an input device, the display device 20 can function as a display device with a touch panel (i.e., a touch panel device).

As explained above, the touch panel 1 according to this embodiment is manufactured by forming the cut out portion 11c at the outer edge of the substrate 11 on the operation face 11b side of the substrate 11 so as to cover the lead-out line wiring region E2 of the lead-out lines 18 of the first electrodes 13 and the second electrodes 14, and forming the housing portion 3 by insert injection molding using the resin material so as to sandwich the outer edge of the substrate 11 from the upper and lower sides, with the operation region E1 of the sensor unit 2 being the front side, and such that the housing portion 3 covers the cut out portion 11c and that the front face 3a of the housing portion 3 is arranged flush with the operation face 11b.

Thus, it is possible to mask the lead-out lines 18 without providing the decorative layer for masking the lead-out lines 18 to make them not visible from outside, resulting in reduction in the manufacturing cost. Also, as mentioned above, the substrate 11 can be prevented from being detached from the housing portion 3 due to the strong impact such as dropping as was the case in the conventional device with the engagement structure using the adhesive layer, thus the touch panel with high reliability can be provided.

Furthermore, as explained above, the housing portion 3 is formed by insert injection molding so as to at least cover the region of the lead-out lines 18 of the respective electrodes of the first electrodes 13 and the second electrodes 14, and the lead-out lines 18 are entirely covered by the resin. Thus, the moisture is less likely to enter from outside, and the sufficient effect is exerted against corrosion of the lead-out lines 18.

The embodiments described herein are only representative embodiments of the present invention and are not intended to limit the present invention. That is, the shown embodiments can be modified or changed in various ways without departing from the spirit and scope of the present invention.

LIST OF REFERENCE SIGNS

1 touch panel
2 sensor unit
3 housing portion
3*a* front face
11 substrate
11*a* back face (operation opposing face)
11*b* front face (operation face)
11*c* cut out portion
12 electrode portion
13 first electrode
14 second electrode
14*a* electrode film
15 intersecting portion
16 insulating layer
17 bridge line
18 lead-out line
E1 operation region
E2 lead-out line wiring region

The invention claimed is:

1. A projected capacitive touch panel comprising,
a sensor unit including first electrodes and second electrodes intersecting with each other, each of the first electrodes and the second electrodes being constituted of a plurality of rows of electrodes, the first electrodes and the second electrodes being formed on a back face of a substrate having translucency such that an intersecting portion of the first electrode and the second electrode is insulated, and
a housing portion formed by insert injection molding so as to sandwich the sensor unit,
wherein a cut out portion is formed on a front face side of the substrate so as to cover a wiring region of lead-out lines of the first electrodes and the second electrodes disposed on a back face side of the substrate, and
wherein the housing portion is formed by insert injection molding using resin material, so as to sandwich an outer edge of the sensor unit from upper and lower sides while covering the cut out portion, and such that a front face of the housing portion is arranged flush with a front face of the substrate, and
wherein the lead-out lines disposed on the back face side of the substrate are made invisible from an operation face side of the substrate by only the housing portion formed so as to cover the cut out portion.

2. The touch panel according to claim 1, wherein the housing portion is molded so as to cover at least front faces of the lead-out lines.

\* \* \* \* \*